April 12, 1960
L. A. JOHNSON
2,932,465
SPINNING REEL
Filed Feb. 14, 1956
2 Sheets-Sheet 1
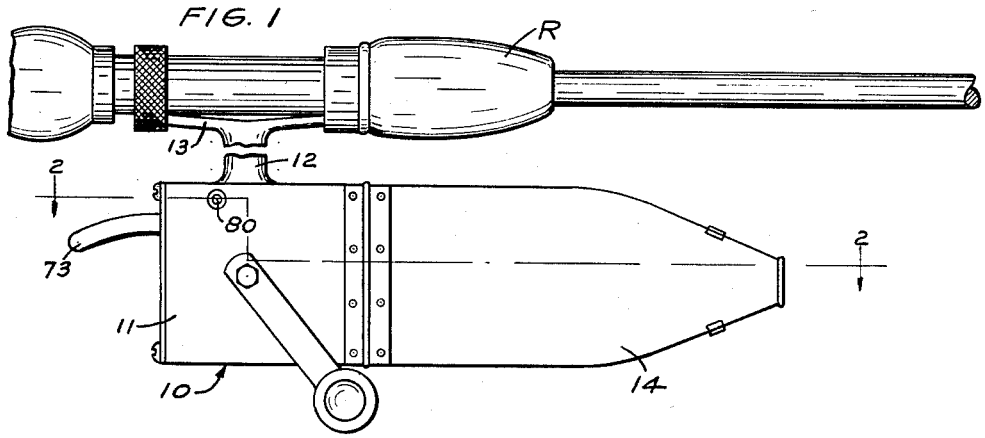
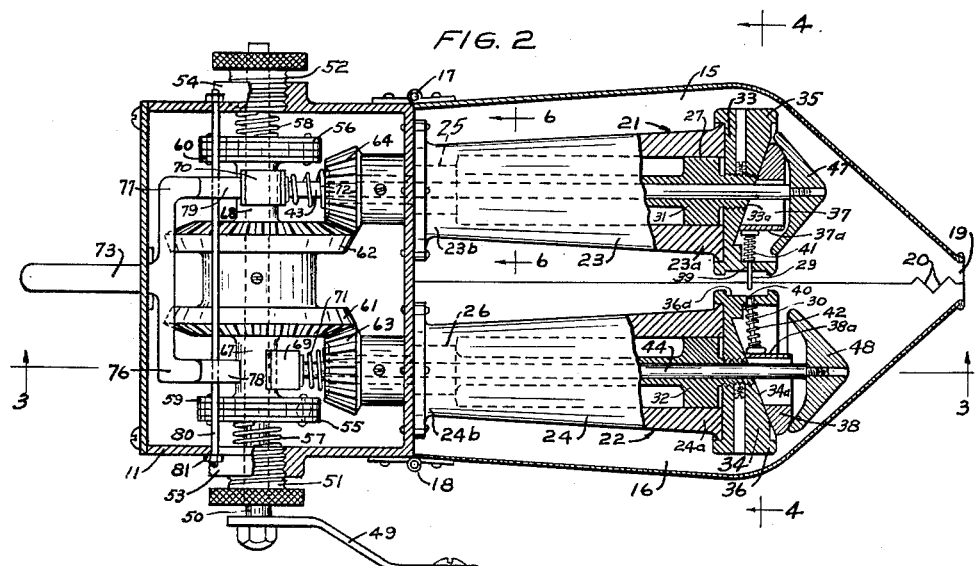
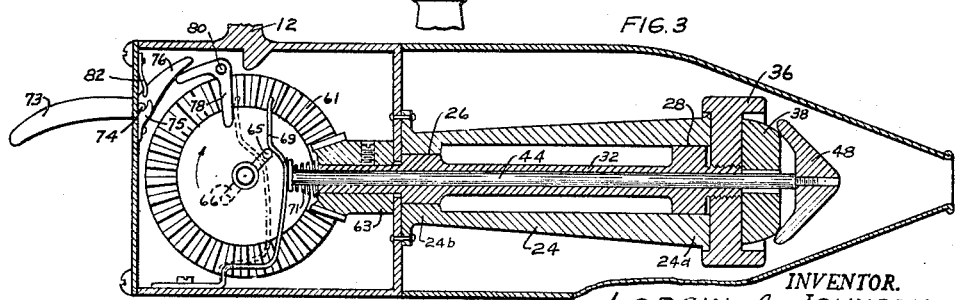
INVENTOR.
LORAIN A. JOHNSON
BY
Williamson, Schroeder,
Adams + Meyers
ATTORNEYS April 12, 1960 L. A. JOHNSON 2,932,465
SPINNING REEL
Filed Feb. 14, 1956 2 Sheets-Sheet 2
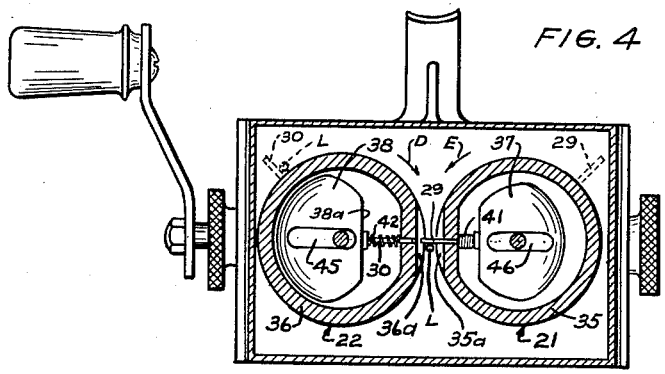
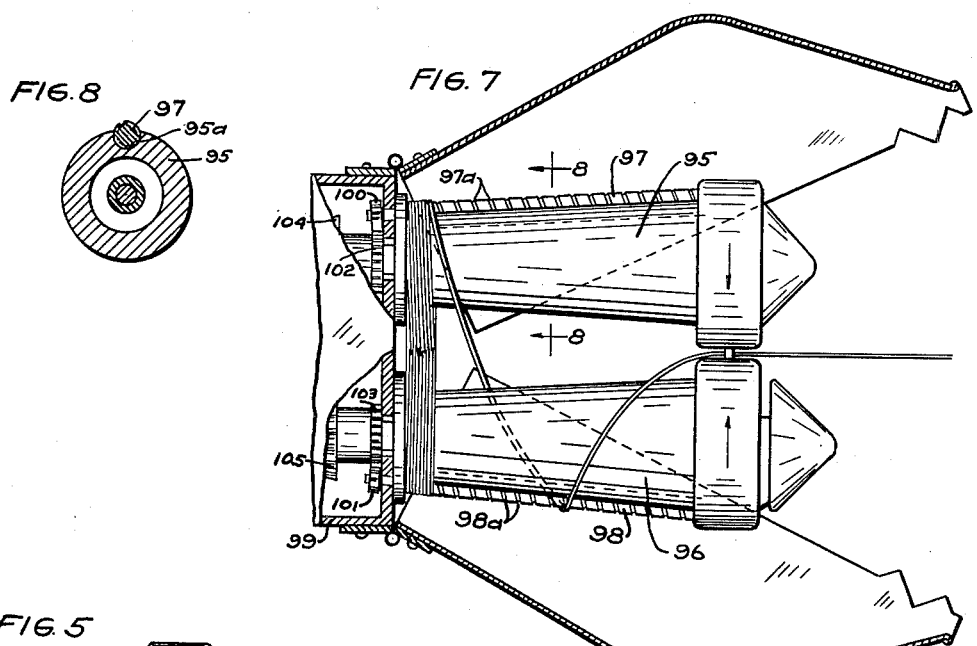
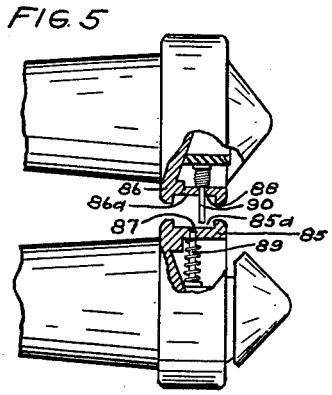
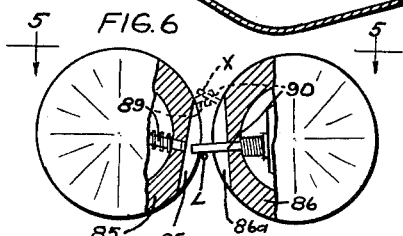
INVENTOR.
LORAIN A. JOHNSON
BY
Williamson, Schroeder,
Adams + Meyers
ATTORNEYS United States Patent Office 2,932,465
Patented Apr. 12, 1960

2,932,465

SPINNING REEL

Lorain A. Johnson, Osakis, Minn.

Application February 14, 1956, Serial No. 565,410

11 Claims. (Cl. 242—84.2)

This invention relates to fishing reels and more specifically relates to the class of reels commonly known as spinning reels.

Most spinning reels presently known have several distinct disadvantages. One of the primary disadvantages is that the operation of such reels causes twisting of the line as it is successively payed off and reeled. It is well known that to reel or wind a line in the form of a figure eight very substantially reduces the overall twisting of the line. As one loop of the figure eight is formed, the line is twisted approximately one-half turn in one direction and as the other loop of the figure eight is formed the line is twisted approximately one-half turn in the other direction. As a result the line is substantially free from twists when it is uncoiled and payed out. Although there have been some disclosures in the past of fishing line holding devices having adjacent spools upon which the line may be manually wound in a figure eight, there has been no successful manually operated reel for winding fishing line in a figure eight pattern and then permitting the line to be freely payed off.

With these comments in mind it is to the elimination of these and other disadvantages that my invention is directed along with the inclusion therein of other novel and desirable features.

An object of my invention is to provide a new and improved fish line reeling device of relatively simple and inexpensive construction and operation.

Another object of my invention is to provide a novel rotary fishing reel constructed to successively wind fishing line thereon and then pay off the line without causing resultant twisting of the line.

Still another object of my invention is the provision of a new rotary fishing reel which winds the line thereon in a figure eight pattern so that the line when again unwound, is oriented in a straight condition and free of twists about axes extending longitudinally of the line.

A further object of my invention is the provision of an improved rotary spinning reel which winds fish line thereon in a figure eight pattern and then permits the line to be freely payed out by slipping the line over the end of the winding spools of the reel without necessitating mechanical unwinding of the line.

A further object of my invention is to provide a novel rotary spinning reel which winds fishing line thereon in a figure eight pattern by successively looping the line around adjacent spools and then moving the loops along the spools into close proximity with each other.

These and other objects and advantages of my invention will more fully appear from the following description made in connection with the accompanying drawings wherein like reference characters refer to the same parts throughout the several views and in which:

Fig. 1 is a side elevation view of the reel comprising the present invention and being attached to a fishing rod;

Fig. 2 is a section view taken longitudinally through the reel and substantially along a broken line as indicated at 2—2 of Fig. 1;

Fig. 3 is a section view taken longitudinally through the reel and on a substantially vertical plane as indicated at 3—3 of Fig. 2;

Fig. 4 is a section view of the reel taken transversely therethrough and on a substantially vertical plane as indicated at 4—4 of Fig. 2;

Fig. 5 is a detail section view similar to a portion of Fig. 2 and showing a slightly modified form of the present invention;

Fig. 6 is a detail end elevation view, partly broken away of the form of the invention shown in Fig. 5;

Fig. 7 is a detail view of a portion of a modified form of the present invention with portions thereof being shown in longitudinal section; and Fig. 8 is a detail section view taken on a substantially vertical plane as indicated at 8—8 of Fig. 7.

One form of the present invention is shown in Figs. 1 to 4. The spinning reel indicated in general by numeral 10 is provided with a frame 11 having a mounting post 12 and an attachment shoe 13 of the conventional type for attachment to a fishing rod R. The frame 11 comprises a housing for carrying the reeling mechanism. The forward portion 14 of the housing is formed in two side by side sections 15 and 16 which are respectively hinged at 17 and 18 to the frame 11 of the reel. The forward portion of the housing defines a line-guiding opening 19 which faces forwardly toward the tip of the rod. It should be noted that offset portions or teeth 20 are formed in the side sections 15 and 16 of the housing adjacent the line-guiding opening 19 and are constructed to mesh together to prevent the line from being moved transversely outwardly of the guide opening 19 and downwardly between the side sections of the housing 15 and 16.

The fishing reel 10 is provided with a pair of elongated and juxtaposed line-receiving spools indicated in general by numerals 21 and 22. The line-receiving spools 21 and 22 are substantially identical to each other and in the form shown, include elongated and tapered cores 23 and 24. The cores 23 and 24 are substantially circular in cross section and are tapered from the outer ends 23a and 24a thereof to the inner ends 23b and 24b which are affixed to the frame 11. Cores 23 and 24 are substantially hollow and provide inner bearing surfaces 25 and 26 adjacent their inner ends and surfaces 27 and 28 adjacent their outer ends. A pair of rotary spooling pins or pickup fingers 29 and 30 are provided at the outer ends of each of the spools 21 and 22 respectively for winding line on the spools in a figure eight pattern. Means are provided for rotatably mounting pins 29 and 30 and for shifting the same inwardly and outwardly of the outer periphery of the spools and toward and away from the axis of rotation thereof. Such means include rotary sleeve shafts 31 and 32 which are respectively carried in bearings 25 and 27, and bearings 26 and 28. The outer ends of sleeve shafts 31 and 32 are affixed to head mounting or cam discs 33 and 34 respectively. It should be noted that the mountings 33 and 34 are substantially cylindrical in shape and are each provided with a planar surface 33a and 34a disposed at an oblique angle with respect to the rotation axis thereof and of shafts 31 and 32. A pair of continuous annular line guides or sleeves 35 and 36 are affixed to the outer peripheries of mountings 33 and 34 to rotate therewith and with the respective rotary shafts. A pair of camming slide elements 37 and 38 are carried by mountings 33 and 34 respectively and are also provided with obliquely disposed planar camming surfaces for the purpose of engaging the surfaces 33a and 34a respectively of the mountings. As best seen in Fig. 4, each of the slide elements 37 and 38 is provided with a flattened side or pin-engaging surface 37a and 38a respectively.

The inner ends of pins 29 and 30 are provided with heads for engaging the surfaces 37a and 38a respectively. The line-guiding sleeves 35 and 36 are provided with pin-carrying bearing apertures 39 and 40 through which the pins 29 and 30 extend. Compression springs 41 and 42 surround the pins 29 and 30 respectively and bear against the heads thereof and against the inner side of guiding sleeves 35 and 36 for urging the pins inwardly of the periphery of the line guides 35 and 36 when the slide elements 37 and 38 are shifted away from the corresponding apertures 39 and 40. Annular line guides 35 and 36 are provided with pin-receiving recesses 35a and 36a respectively as best seen in Figs. 2 and 4, which recesses are formed in the outer periphery thereof adjacent the apertures 39 and 40 therein. It should be noted that the recesses 35a and 36a are formed between the ends of the corresponding annular line guides and that adjacent the ends of the line guides the periphery thereof is smoothly rounded. The line guide is formed to permit a line to be longitudinally carried thereover and to permit the pins to swing into the recess of the opposite line guide so as to pick up the line.

The actuating mechanism for projecting and retracting pins 29 and 30 outwardly from and inwardly of the periphery of line guides 35 and 36 includes projectable and retractable control elements or shafts 43 and 44 which extend through the rotary sleeve shafts 31 and 32. The shafts 43 and 44 respectively extend through elongated slot openings 45 and 46 which are provided in the camming slide elements 37 and 38. Engaging elements or heads 47 and 48 are fixed to the outer ends of shafts 43 and 44 and are substantially conically shaped and are provided with slightly recessed interiors for engaging and urging the slide elements 37 and 38 along the camming surfaces 33a and 34a of mountings 33 and 34.

Rotary drive means is provided for rotating the shafts 31 and 32 and for maintaining the pins 29 and 30 in orientation with respect to each other. In the form shown, such rotary drive means include a rotary handle 49 connected to a drive shaft 50 which is journalled in bushings 51 and 52 which are threadably carried in bosses 53 and 54 respectively. Bosses 53 and 54 may be formed integrally of frame 11. Shaft 50 has driving clutch plates 55 and 56 keyed thereto to rotate therewith but are permitted to shift slightly longitudinally thereof. Springs 57 and 58 bear against the bushings 51 and 52 and against the drive clutch plates 55 and 56 and urge the clutch plates inwardly along shaft 50. Driven clutch plates 59 and 60 are mounted in spaced and engaging relation with drive clutch plates 55 and 56 respectively and are supported on rotary shaft 50 for rotation with respect thereto. The driven clutch plates 59 and 60 are affixed to interconnected bevel driving gears 61 and 62 for driving the same. The bevel gears 61 and 62 are meshed with bevel gears 63 and 64 which are respectively affixed to the rotary sleeve shafts 32 and 31 respectively for driving the same. It should be noted that a predetermined relation is provided by the meshed gears 61 and 63 and gears 62 and 64 so as to drive the rotary shafts 31 and 32 in synchronism with each other and so as to drive the shafts 31 and 32 at a predetermined speed relation with respect to the rotation of gears 61 and 62. In the form shown, there is a two to one step up gear ratio between the drive gears 61 and 62 and the driven gears 63 and 64 so as to rotate shafts 31 and 32 and pins 29 and 30 at twice the speed of the rotary driving gears 61 and 62. The driving interconnection provided by the meshed bevel gears causes the pins 29 and 30 to rotate in opposite directions, as best seen in Fig. 4 and indicated by the arrows D and E, and the pins are so oriented that they will swing together into substantial alignment in a position between their respective rotation axes.

The actuating mechanism for projecting and retracting pins 29 and 30 includes a pair of cam actuators 65 and 66 which are respectively affixed to the sleeve interconnections 67 and 68 adjacent gears 61 and 62 respectively. In the form shown, the cam actuators 65 and 66 constitute lugs or screws which extend in substantially diametrically opposed relation with respect to each other, as best seen in Fig. 3. The cam actuators 65 and 66 are disposed in substantial alignment with the projectible shafts 44 and 43 respectively for projecting the same.

A pair of cam followers 69 and 70 are carried by the frame 11 adjacent the cam actuators 65 and 66 respectively, as best seen in Fig. 3 to be engaged thereby and to move the shiftable control shafts 44 and 43. Cam followers 69 and 70, in the form shown, are constructed of spring steel to resiliently return to the dotted position shown in Fig. 3 when released by the cam actuators. Coil springs 71 and 72 bear against the ends of bevel gears 63 and 64 respectively and against the enlarged heads of shafts 44 and 43 respectively and urge the shafts 44 and 43 inwardly toward the cam actuators so as to cause pins 29 and 30 to be projected when the shafts 44 and 43 are retracted. The corresponding cam actuators and cam followers operate during alternate revolution of gears 63 and 64 and therefore of pins 29 and 30. As the pins 29 and 30 swing inwardly toward each other one of the pins will be quickly retracted as the other pin swings into proximity therewith. The operation of the mechanism will be more fully set forth hereinafter.

Means are provided for simultaneously retracting both of the pins 29 and 30 to permit the line to be freely payed off the spools. In the form shown, such means include a finger-operated trigger 73 extending through the frame 11 and having trunnions 74 carried in trunnion bearings 75 to permit vertical swinging of trigger 73. The inner end of trigger 73 is bifurcated to provide a pair of arms 76 and 77. A pair of actuators 78 and 79 are swingably carried on a shaft 80 which is affixed as by nuts 81 to the frame 11. The swingable actuators 78 and 79 engage the trigger arms 76 and 77 and also engage the cam followers 69 and 70 for moving the same simultaneously and thereby projecting shafts 44 and 43 respectively for retracting spooling pins 29 and 30. A leaf spring 82 is carried by frame 11 and engages the trigger 73 and urges the same in a clockwise direction about trunnions 74 for maintaining the actuators 78 and 79 against the cam followers 69 and 70 respectively, when the cam followers are individually in their rearmost dotted positions in Fig. 3.

In the form of the invention shown in Figs. 5 and 6 the construction of the reel is substantially identical in substantially all of the mechanism thereof to that shown in Figs. 1 to 4. In this form of the invention the annular line guides 85 and 86 (which correspond to line guides 35 and 36) are provided with pin-carrying bearing apertures 87 and 88 respectively which are disposed in adjacent, but different vertical planes. In this form of the invention the spooling pins 89 and 90 are thereby carried in different vertical planes and will thereby swing into side by side relation as they swing toward each other when revolved. As best seen in Fig. 6, the pins will swing from the dotted position X thereof into the recesses 85a and 86a of the opposite line guides 85 and 86 to engage the line. The spooling pins 89 and 90 are shown of greater thickness in Fig. 6 as compared to Fig. 5 and the spooling pins are oblong in cross section. The pin-retracting mechanism will rapidly retract, during alternate revolutions, and one of the pins 89 and 90 between the dotted position X thereof and the full line position shown in Fig. 6 so that one of the pins releases the fish line L and the other pin picks up the line to carry it around its corresponding spool.

In the form of the invention shown in Figs. 7 and 8, the construction of the fishing reel is substantially identical to that shown in Figs. 1 to 4 and in this form of the invention the forwardly extending portions of the housing are shown in open position. In this form of the invention means are provided for progressively moving the line windings on the cores 95 and 96 toward the inner ends thereof. In the form shown, such means include a pair of elongated rotary shafts 97 and 98 which are respectively carried in elongated recesses as seen at 95a in Fig. 8 in the core peripheries. Portions of the periphery of shafts 97 and 98 extend transversely outwardly from the peripheries of the respective cores 95 and 96 so as to engage the line windings on the cores. The shafts 97 and 98 are provided with surface deformations in the periphery thereof, which in the form shown, comprise grooves 97a and 98a which extend spirally between the ends of the shafts. In this form of the invention the inner ends of shafts 97 and 98 extend through the reel frame 99 and have rotary gears 100 and 101 affixed thereto respectively. Driving gears 102 and 103 are affixed to the rotary driving gears 104 and 105 (which correspond to gears 64 and 63 respectively in Figs. 1 to 4), and are respectively meshed with gears 100 and 101 for rotating shafts 97 and 98.

*Operation*

In operation, the handle 49 will be manually turned during the reeling operation to cause rotation of gears 61 and 62. For each half revolution of gears 61 and 62, bevel gears 63 and 64 make a complete revolution and therefore spooling pins 29 and 30 make a complete revolution. Assuming that the line L is secured adjacent the inner end of one of the spools and extends longitudinally over the periphery of guide 36 and outwardly of the guide opening 19, the pin 30 will carry the line L from the dotted position shown in Fig. 4 toward the line passage between the two line guides in the direction of arrow D. The line will be carried in a clockwise direction around spool 22. When the pin 30 is in its dotted position spooling pin 29 will be in its corresponding dotted position. The pin 30 swings toward the full line position thereof and as the pins 29 and 30 swing together, the pin-retracting camming mechanism connected with gear 61 and the inner end of projectible shaft 44, will cause pin 30 to be retracted. The spooling pin 29 will extend across the line in receiving passage between the spools and into the recess 36a of guide 36 to pick up the line L and carry it in a counterclockwise direction around spool 21. When spooling pin 29 carries the line L around spool 21, one loop of the figure eight winding will be formed about the core 23 and the fishing line L will thereafter be transferred in a similar manner to the projected spooling pin 30. Each of the spooling pins 29 and 30 will be alternately retracted during alternate revolutions thereof by the cam in the control actuating mechanism.

When one of the shiftable shafts such as 44 is projected outwardly the slide element 38 is permitted to move toward the position shown in Fig. 2 and the spring 42 will urge the slide element 38 and the pin 30 transversely of the rotation axis so as to retract spooling pin 30 inwardly of the periphery of the line guide 36.

Because the cores 23 and 24 are tapered to a diminished size from the outer ends thereof to the inner ends thereof, the windings will move toward the inner ends thereof as they are formed on the spools and as the line is kept taut. By virtue of the fact that the cores 23 are of substantial length, a substantial length of line may be wound thereon.

If, during the reeling operation the fish on the line exerts a substantial pull, the tension may be kept on the line by continued turning of the handle 49. The pairs of driving and driven clutch plates 55 and 59 and 56 and 60 respectively may slip and permit relative rotary movement between the driving shaft 50 and the gears 61 and 62. In fact, the fish may exert enough tension on the line to cause the reeling mechanism on the spools to turn backwards as the rotation of the handle is continued in a forward direction. The clutch tension may be adjusted by adjusting the positions of bushings 51 and 52.

When the reeling operation is completed the line may be cast out again by moving the outer end portion of the trigger 73 upwardly. This movement of the trigger causes counter-clockwise shifting of the actuators 78 and 79 which move the cam followers 69 and 70 and cause both spooling pins 29 and 30 to be simultaneously retracted. The retraction of these spooling pins permits the line to be freely payed off the spools without necessitating the rotating of the mountings 33 and 34 and the spooling pins. When the cast is completed, the trigger 73 is again released and the actuators 78 and 79 will swing back to the position shown to permit the reeling operation of the reel to be commenced again.

In the form of the invention shown in Figs. 5 and 6, the spooling pins will swing inwardly toward each other and one of the pins will be retracted as the other pin extends into the recess of the opposite line guide. Specifically, as seen in Fig. 6, if the spooling pin 89 is carrying the line around guide 85, the pin 90 will swing into the recess 85a to engage the line L. The pin 89 will thereupon be retracted between the dotted position thereof and the full line position thereof, whereby to permit spooling pin 90 to pick up the fish line L and carry it around guide 86. The pin 89 will thereafter be projected again after it is swung partly around the axis to pick up the line again as spooling pin 90 brings the line around.

In the form of the invention show in Fig. 7, the rotary gears 104 and 105 cause the gears 102 and 103 to revolve, which in turn drive the gears 100 and 101 to turn the shafts 97 and 98. As the shafts 97 and 98 are turned the fish line engaging the spirally disposed grooves therein will be carried toward the inner end portions of the cores 95 and 96.

It will be seen that I have provided a new and improved spinning reel which is constructed to reel a fishing line inwardly and wind the line in a figure eight pattern around a pair of juxtaposed spools so that the line will remain substantially untwisted when it is again payed off the spools.

It should also be noted that I have provided an improved reel which winds a fish line thereon in a figure eight pattern and then permits the line to be freely payed therefrom without necessitating turning of the line winding mechanism.

It will, of course, be understood that various changes may be made in the form, details, arrangement and proportion of the parts without departing from the scope of my invention.

What is claimed is:

1. In a fishing reel, the combination of a frame, a pair of juxtaposed spools having inner end portions mounted on said frame and having open outer ends disposed adjacent to each other, means carried by said frame and defining a line guiding opening spaced outwardly in a direction longitudinally of said spools from the outer ends thereof, said opening guiding a fish line longitudinally outwardly of said spools and off the outer ends thereof, a pair of spooling pins each projecting transversely outwardly of a respective spool and beyond the outer periphery thereof, rotary drive means connected with said pins and swinging the same around the periphery of the corresponding spools, each of said pins being adapted to carry the line inwardly through said opening and around the periphery of the corresponding spool, said rotary drive means being constructed and arranged for rotating said pins in opposite directions and orienting the same to swing toward each other and into substantially parallel proximity with each other, and actuating mechanism connected with said pins and being constructed and arranged to individually and alternately retract said pins in alternate revolutions thereof as said pins swing into mutual proximity, said actuating mechanism retracting said pins inwardly of the periphery of the corresponding spool, whereby the fish line will pass inwardly through said opening and be alternately carried around said several spools to be wound in a figure eight pattern on said spools.

2. In a fishing reel the combination of a frame, a pair of juxtaposed spools having inner end portions mounted on said frame and having open outer ends disposed adjacent to each other, said spools being adapted to receive over the open outer ends thereof a line extending generally longitudinally of the spools, a pair of retractable spooling pins each projecting transversely outwardly of a respective spool and beyond the outer periphery thereof, said spooling pins being mounted for rotation to swing around the periphery of the corresponding spool and thereby carry such a line around the periphery of the spool and releasing the line when retracted, and a rotary interconnection between said pins orienting the same to swing inwardly toward each other and into substantially parallel proximity with each other whereby to permit the line to be transferred from one pin to the other so as to be carried about different spools, whereby when said pins are rotated in opposite directions and are alternately retracted during alternate revolutions as the same swing toward each other into mutual proximity, the line will alternately be carried around the spools in different rotary directions to form the opposite loops of a figure eight winding pattern.

3. In a fishing reel the combination of a frame, a pair of juxtaposed spools having inner end portions mounted on said frame and having open outer end portions disposed closely adjacent to each other, each of said spools being adapted to receive over the outer end thereof, a fish line extending generally longitudinally of the spool, a pair of rotary and retractable spooling pins each projecting transversely outwardly of a respective spool and beyond the outer periphery thereof and each swinging around the periphery of the respective spool to carry a fish line therearound, and each of said pins being swingable toward the opposite spool and inwardly of the periphery thereof to pick up a line from the opposite spool, rotary drive means rotating said pins in opposite directions and orienting the same to swing toward each other and into opposed parallel relation to transfer the fishing line from one pin to the other, and actuating mechanism connected with said pins and being constructed and arranged to individually retract said pins, whereby as said pins are rotated with one of the same carrying the fish line around the periphery of its corresponding spool, said last mentioned pin may be retracted to permit the other pin to pick up the fish line and carry the same around its corresponding spool and thereby wind the line in a figure eight pattern on the spools.

4. In a fishing reel the combination of a frame securable to a fishing rod, a pair of adjacent spool cores mounted on said frame and having adjacent and opposite open outer ends, each of said cores being adapted to carry over said outer ends a fish line extending generally longitudinally of said core, a pair of continuous line guides each disposed transversely outwardly from and around the periphery of a respective core and being disposed adjacent to and opposite each other, a pair of retractable pick-up fingers rotatably carried adjacent respective line guides and extending outwardly of the periphery thereof for rotating around the periphery of the respective cores, and drive means connected with said fingers and rotating the same in opposite directions and including mechanism constructed and arranged for individually retracting said fingers and causing said fingers to alternately release and pick up the fish line and thereby effect a transfer of the fish line from one core to the opposite core, whereby to cause winding of the fish line in figure eight loops formed around said adjacent cores.

5. In a fishing reel the combination of a frame, a pair of juxtaposed spools having inner end portions mounted on said frame and having open outer ends disposed adjacent and opposite to each other, means carried by said frame and defining a line-guiding opening spaced outwardly in a direction longitudinally of said spools from the outer ends thereof and carrying a line longitudinally outwardly of said spools and off the outer ends thereof, a pair of spooling pins each projecting transversely outwardly of a respective spool and beyond the outer periphery thereof, rotary drive means connected with said pins and swinging the same around the periphery of the corresponding spool to cause each of the pins to carry a line inwardly through said opening and around the periphery of the corresponding spool, said rotary drive means being constructed and arranged for rotating said pins in opposite directions and orienting the same to swing toward each other and into substantially opposed parallel relation with each other, and a pair of control elements each extending through a respective spool and being movable with respect to the corresponding pin, means interconnecting each of said control elements with the respective pin and being constructed and arranged to retract the pin when said control element is moved relative to said pin, and means interconnecting each of said control elements and said rotary drive means and causing said control elements to be alternately moved during alternate revolutions of said pins as the same swing into proximity with each other to thereby alternately retract the pins during alternate revolutions thereof and thereby cause the line to first be carried around one spool by one of said pins and then be transferred to the other pin to be carried thereby around the opposite spool.

6. In a fishing reel the combination of a frame, a pair of juxtaposed spools having inner end portions mounted on said frame and having open outer ends disposed adjacent and opposite to each other, means carried by said frame and defining a line-guiding opening spaced outwardly in a direction longitudinally of said spools from the outer ends thereof to carry a fish line longitudinally outwardly of said spools and off the outer ends thereof, a pair of spooling pins each projecting transversely outwardly of a respective spool and beyond the outer periphery thereof and carrying a line peripherally of the spool, rotary drive means connected with said pins and constructed and arranged for swinging the same around the respective spool peripheries and for swinging said pins in opposite directions, said pins being oriented to swing toward each other and into opposed and substantially parallel relation to effect transfer of the fish line from one pin to the other, movable mechanism connected with said pins and being constructed and arranged for retracting the same, and camming means connected with said rotary drive means and said movable mechanism and being constructed and arranged for individually and alternately retracting said pins in alternate revolutions thereof as the same swing into opposed relationship with each other and thereby causing during each revolution of the pins, one pin to release the fish line and the other pin to pick up the fish line and carry the same around the periphery of the corresponding spool.

7. In a fishing reel, the combination of a frame, a pair of juxtaposed spools having inner end portions mounted on said frame and also having adjacent open outer end portions, means carried by said frame and defining a line guiding opening for passing line longitudinally outwardly from said spools and off the outer ends thereof, movable line-carrying apparatus carried by said frame adjacent the outer end portions of said spools and being constructed and arranged to move and carry the line in a figure eight pattern around the peripheries of said spools, and driving means including a pair of drive shafts extending through said spools connected with said apparatus for operating the same.

8. In a fishing reel, the combination of a frame, a pair of juxtaposed spools having inner end portions mounted on said frame and having open outer end portions disposed adjacent to and opposite each other, means carried by said frame and defining a line-guiding opening spaced outwardly in a direction longitudinally of said spools from the outer ends thereof and carrying a fish line off the outer ends of said spools, a pair of spooling pins each projecting transversely outwardly of a respective spool and beyond the outer periphery thereof, rotary drive means connected with said pins and swinging the same around the periphery of a corresponding spool and thereby being adapted for carrying a line around the spool periphery, said rotary drive means being constructed and arranged for rotating said pins in opposite directions and orienting the same to swing toward each other and into substantially parallel and closely spaced relation with each other to permit the fish line to be transferred from one pin to the other, and actuating mechanism connected with said pins and being constructed and arranged to individually and alternately retract said pins in alternate revolutions thereof as said pins swing into mutual proximity, the line-carrying pin being retracted to permit the other pin to pick up the line and carry the same around its corresponding spool, and control mechanism connected with said pins and being constructed and arranged to substantially simultaneously retract both of said pins and thereby permitting the line to be freely payed off the spools, whereby the line will be wound on said spools in a figure eight pattern to be free of twists therein when again payed off the reel.

9. In a fishing reel the combination of a frame securable to a fishing rod, a pair of adjacent spool cores mounted on said frame and having open outer ends, a pair of continuous line guides each disposed transversely outwardly and around the periphery of a respective core, said line guides being positioned opposite each other and in closely spaced relation to define a line passage therebetween, a pair of retractable pick up fingers each projecting transversely outwardly of a respective core and beyond the outer periphery of the corresponding line guide and across said passage, rotary drive means connected with said fingers and swinging the same around the periphery of the corresponding line guides for carrying the line around the periphery of the line guide and the corresponding core, said rotary drive means being constructed and arranged for rotating said pins in opposite directions and orienting the same to swing toward each other into parallel, side-by-side relation in said passage, camming mechanism connected with said rotary drive means and connected with said fingers for individually retracting the fingers, said camming mechanism being constructed and arranged to alternately retract said fingers during alternate revolutions as said fingers swing through said passage, whereby the fish line will be alternately carried around separable spools to be wound in a figure 8 pattern thereon.

10. In a fishing reel the combination of a frame, a pair of elongated and juxtaposed spools having inner end portions mounted on said frame and also having adjacent outer end portions disposed opposite each other, each of said spools including an elongated stationary core and an endless guide surrounding the periphery of said core and passing the line longitudinally thereover outwardly from the core, means carried by said frame and defining a line-guiding opening and passing the line longitudinally outwardly from said spools and the endless guides, movable line-carrying apparatus mounted adjacent the outer end portions of said spools and being constructed and arranged to move and carry the line in a figure 8 pattern around the peripheries of said spools to thereby wind the line on the spools in a figure 8 pattern, driving means connected with said apparatus and moving the same for winding the line on the spools, rotary screw conveyor mechanism connected with said drive means and including a pair of elongate rotary shafts each rotatably mounted in and extending longitudinally of a respective core, each of said shafts having peripheral portions protruding transversely outwardly of the periphery of said core and engaging the line wound thereon and each of said shafts having an elongated surface deformation in the periphery thereof and extending spirally toward the ends thereof and moving the line windings toward the inner end portions of said cores, whereby the line will be wound in a figure 8 pattern progressively outwardly from the inner ends of the spools and the line may be freely payed off the outer end portions of said spools and through said guide openings.

11. In a fishing reel, the combination of a frame, a pair of juxtaposed spools having inner end portions mounted on said frame and also having adjacent open outer end portions, means carried by said frame and defining a line-guiding opening for passing line longitudinally outwardly from said spools and off the outer ends thereof, a pair of rotary line-carrying apparatuses carried by said frame and each being respectively disposed adjacent the outer end portion of a corresponding spool and each of said apparatuses including mechanism constructed and arranged to alternately carry the line in a loop around the corresponding spool and then pass the line off to the other apparatus to carry the line in a figure 8 pattern around the peripheries of said spools, and drive means connected with said apparatuses.

References Cited in the file of this patent

UNITED STATES PATENTS

| | | |
|---|---|---|
| 2,331,004 | Standish | Oct. 5, 1943 |
| 2,403,311 | Steele | July 2, 1946 |
| 2,599,603 | Barker | June 10, 1952 |
| 2,633,307 | Morgan et al. | Mar. 31, 1953 |